United States Patent [19]

Milnes

[11] Patent Number: 4,587,410
[45] Date of Patent: May 6, 1986

[54] CAPACITIVE CARD AND READER PARKING SYSTEM

[76] Inventor: Arthur G. Milnes, 1417 Iverness Ave., Pittsburgh, Pa. 15217

[21] Appl. No.: 598,472

[22] Filed: Apr. 9, 1984

[51] Int. Cl.⁴ .............................................. G06K 5/00
[52] U.S. Cl. ................................ 235/382; 235/382.5; 235/451; 235/381
[58] Field of Search .................... 235/451, 382, 382.5, 235/381

[56] References Cited

U.S. PATENT DOCUMENTS

| | | |
|---|---|---|
| 3,585,368 | 6/1971 | Nunamaker . |
| 4,017,834 | 4/1977 | Cuttill et al. . |
| 4,020,325 | 4/1977 | Pfost et al. . |
| 4,328,415 | 5/1982 | Eaton ................................. 235/451 |
| 4,331,863 | 5/1982 | Sidline et al. ........................ 235/434 |

FOREIGN PATENT DOCUMENTS

| | | |
|---|---|---|
| 1375087 | 11/1974 | United Kingdom . |
| 2027965A | 2/1980 | United Kingdom . |

*Primary Examiner*—Harold I. Pitts
*Attorney, Agent, or Firm*—Buell, Ziesenheim, Beck & Alstadt

[57] ABSTRACT

The apparatus includes a card which entitles the holder to a number of units of parking time represented by discrete capacitances carried by the card. The parking time is metered by a card reader which accepts the card senses the capacitance carried thereby and measures out a unit of parking time for each unused capacitance. The reader responds to a predetermined capacitance and renders inoperative each capacitance as it is used up. The elements of each capacitance are formed so that the value of the capacitance can be greatly reduced by a mechanical or other type of punching operation. Two types of reader are disclosed, one which accepts the card in increments corresponding to a single capacitance and the other which accepts the entire card and automatically scans the capacitances carried thereby. Several forms of cards are disclosed.

17 Claims, 16 Drawing Figures

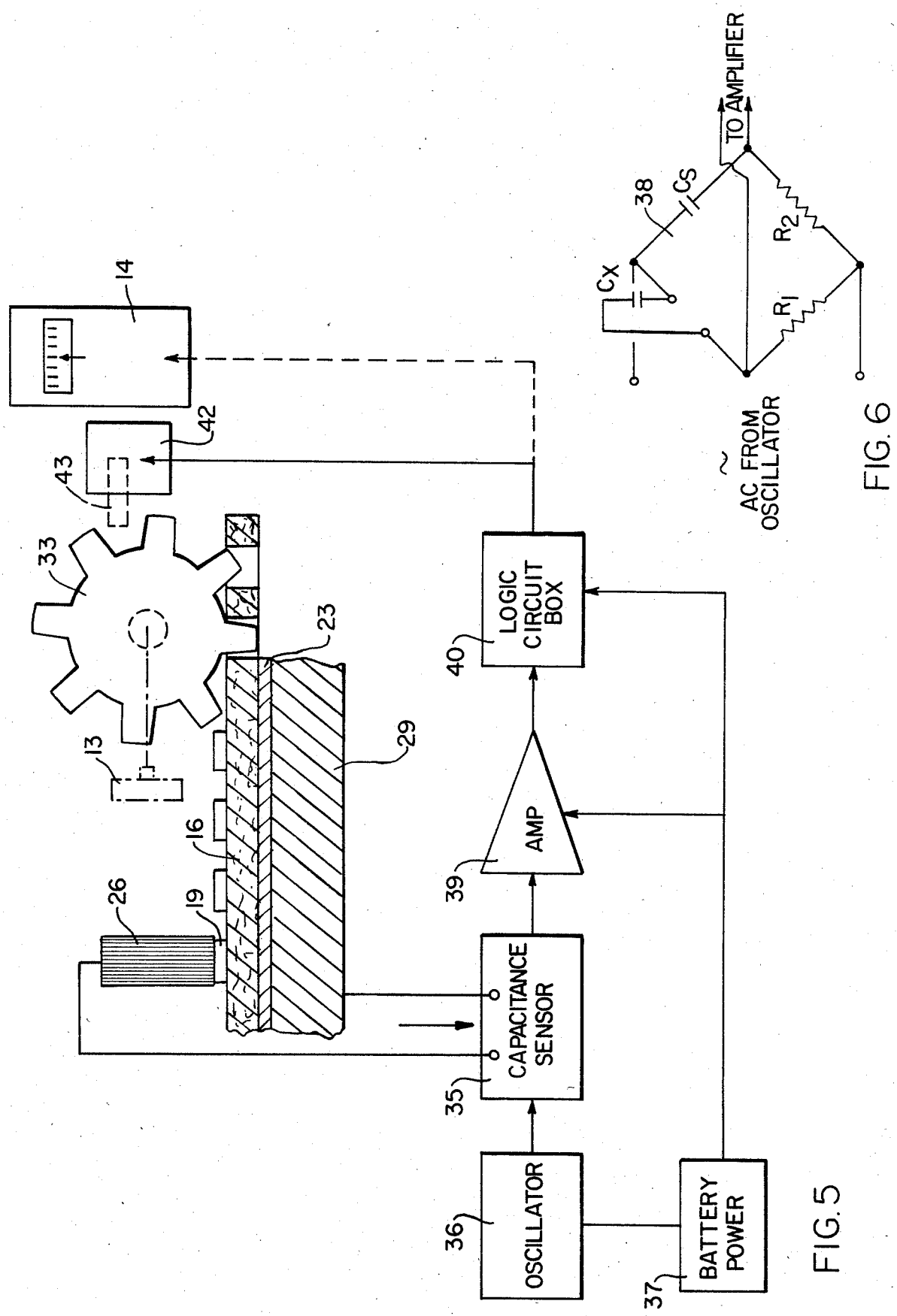

CAPACITIVE CARD AND READER PARKING SYSTEM

FIELD OF THE INVENTION

This invention relates to card controlled apparatus for dispensing services. It is more particularly concerned with parking meters which dispense parking time in response to the introduction of a card-like ticket into the meter, the ticket having electrical capacitance indices thereon. My invention is also applicable to automatic laundries, photocopiers, and vending machines of other descriptions for dispensing services.

BACKGROUND OF THE INVENTION

My invention will be described hereinafter with reference to parking meters but it will be understood that that use is exemplary only.

At present almost all parking meters controlling the use of positions in automobile parking lots are coin-operated and mechanical in nature. In recent years there has been an increase in the cost of such parking to the point where quarter-dollars may be the only accepted coin and a spell of one or two hours of parking time may require the provision of many such coins. This presents an availability problem that is a growing source of inconvenience to frequent users of such meters. Attempts have been made therefore to devise credit card related systems to operate parking meters.

One approach is the use of a conventional bank credit card, or Visa or Mastercharge card, to purchase a magnetically encoded parking card entitling the purchaser to a number of units, for example 20 hours, of parking time (see for instance Kenyon UK Patent Application No. 2027965A). The parking card could be dispensed from a bank money dispensing machine or from an adjacent stand-alone dispensing machine after a standard bank credit card, or Visa or Mastercharge card, had been temporarily magnetically encoded to allow dispensing of the parking card. The parking card could then be carried in a purse or wallet and used in the parking location. However, provision would be required for reading the card's magnetic symbols, for selecting the required value and time of the parking and for subtracting the cash value expended from the purchased value of the card. Both the reading and the subtracting processes are difficult to achieve with low-cost low-power apparatus. Typically a card with magnetic symbols must be scanned by a reading head at a known speed and this entails problems of cost and reliability. Then subtraction logic must be performed and the card rewritten with the unused value remaining. This requires a complicated mechanism and an associated sophisticated electrical system. An example of such a system may be found in Pfost et al. U.S. Pat. No. 4,020,325.

Because of the high cost, such systems have not come into general use in connection with parking meters. It is conceivable that such a system might be set up as a single unit to supply parking time to a large array of individual parking meters, which would distribute the cost. It could dispose coin-like parking tokens that could then be used as substitutes for coins in regular parking meters. However, many street areas have parking meters in widely dispersed locations not conveniently serviced by a central token dispenser. The need therefore exists for a low-cost box unit that could be added to an existing parking meter post to provide parking time with the aid of a low cost card. The electrical power requirement of each box should be low enough to be provided by battery rather than 60 Hz electrical power line.

In the present state of the art of magnetically encoded cards, it is difficult to apply them economically to parking control. My invention makes use of capacitively encoded cards of special design to achieve parking control at considerably lower cost.

There have been a few descriptions of capacitively encoded cards, different from mine, in the literature of cards and card readers. For instance, Cuttill et al. U.S. Pat. No. 4,017,834, Apr. 12, 1977, discloses a credit card precoded in binary code representing several digits by an arrangement of high dielectric-constant spots or discs and low dielectric-constant spots or discs arranged in several bit groupings related to a plurality of identification digits.

Another system is disclosed in Eaton U.S. Pat. No. 4,328,415, May 4, 1982, in which a card for a viewdata terminal is read and used to enable access to the viewdata computer and to charge the appropriate account for use of the viewdata system. The card reader detects voltage signals from capacitive couplings between electrodes in the card.

In U.S. Pat. Nos. 4,017,834 and 4,328,415 the important function of the coding is that the card identifies the user of the card, in order to allow properly-billed credit or service charges.

In my invention to be described hereinafter the capacitive coding does not identify the user of the card but does represent prepaid services. The electronic readout system is significantly different and simpler than the readout systems in U.S. Pat. Nos. 4,017,834 and 4,328,415 since readout of digital bits is not needed.

BRIEF DESCRIPTION OF DRAWINGS

FIG. 5 is a schematic of my card reading apparatus;

FIG. 6 is a schematic of one form of the capacitance sensor shown in FIG. 5;

SUMMARY OF THE INVENTION

The principal object of the present invention is to allow the purchase of parking time with a card system that is an alternative to the need to supply coins for parking meter operation.

The card itself is a wallet-size parking card that is pre-purchased and entitles the holder to a number of units of parking time determined by electrically capacitive components on the card. These components become deactivated by change in value as use of the card proceeds. Finally, all the prepaid parking is consumed and a new card must be purchased. The deactivation is accomplished in the card reader by means which clip or punch the card when the user is setting up a visible indicator showing the parking time he desires to purchase.

My card reading apparatus makes contact with the terminals of an individual capacitance component when the card is inserted in the reader apparatus. The capacitance is measured by any simple capacitance sensing device, for example, by comparing the component capacitance with a standard capacitance in a Wheatstone-type bridge circuit energized by a quartz oscillator. That oscillator may be of the type used in electronic watches and supplies voltage at a frequency suitable for measuring the low value of capacitance carried by my card. That value may be on the order of 12 pF before deactivation and half that value thereafter. The bridge output triggers the service dispensing means when the capacitance sensed is in the activated condition, but does not do so if the capacitance sensed has been deactivated. The service dispensing means includes means to deactivate the measured capacitance In one embodiment of my card reader apparatus the card is inserted one capacitance element at a time and that capacitance sensed as above mentioned. In another embodiment the card is fully entered, my apparatus scans the individual capacitances carried by the card and triggers the service dispensing means when it senses a trigging value of any capacitance.

It is envisaged that the parking card of my system may be purchased at many locations in shops and stores or through the mail. A particularly convenient class of location may be the money dispensing machines presently installed outside most banks. The user would insert his banking card, or Visa or Mastercharge or similar card, into the machine and, following an instruction code, indicate his wish to purchase a parking card, say for $10.00. His bank account would be debited $10.00 plus a service charge and a temporary magnetic code would appear on his credit card. This credit card would then be inserted in a parking card dispenser and the parking card received, and at the same time the temporary magnetic code representing the enabling action would be erased. At a later stage it is envisaged that some bank money dispensing machines could be modified to allow direct dispensing of the parking cards.

DESCRIPTION OF PREFERRED EMBODIMENT

Figure 1:
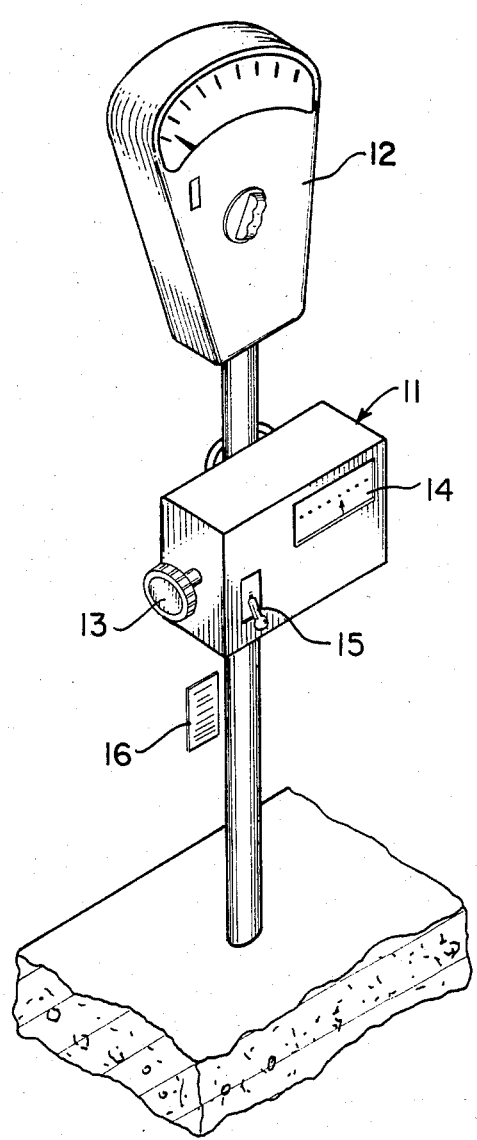
FIG. 1 is an isometric of my apparatus mounted on a conventional parking meter standard.

FIG. 1 shows the card reader box 11 of my invention mounted on the standard of a conventional parking meter 12. On one side of box 11 is a knob 13 which may be rotated to advance the card into the box and to select the desired parking interval. That interval is displayed by indicator 14 which is coupled to knob 13 as will be shown hereinafter. A lever 15 is mounted on one face of box 11 for purposes to be described hereinafter. The card 16 of my invention is inserted through a slot in box 11 which may be in any side thereof. In FIG. 1 the slot is in the bottom and is not shown.

Figure 2:
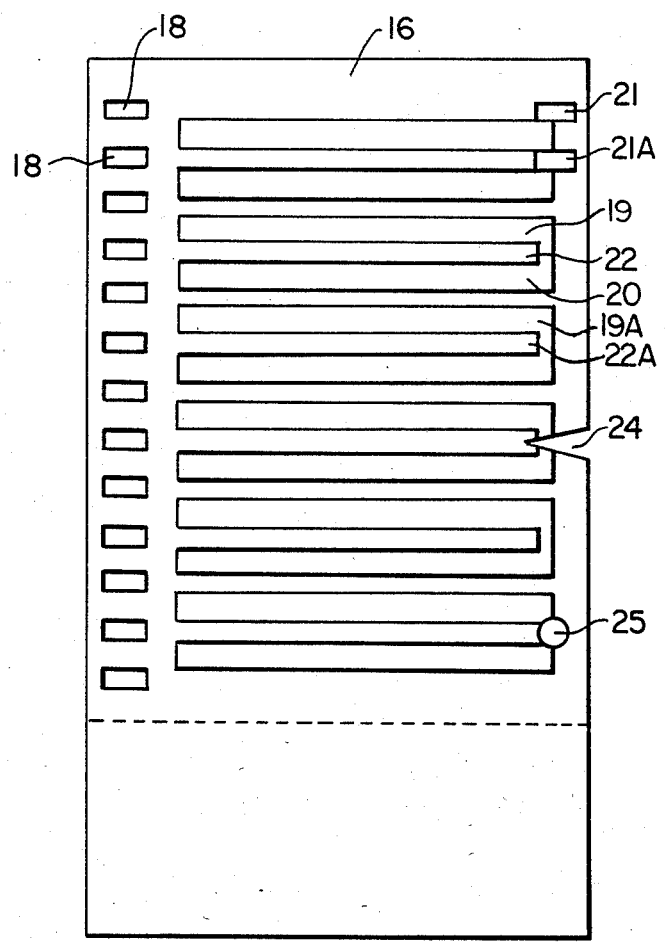
FIG. 2 is a plan of a preferred form of a card of my invention.

FIG. 2 is the top view of a parking card or token 16 that is approximately the size of a dollar bill so that it will fit conveniently in a wallet or purse. It is made of very thin cardboard or high grade paper that is treated to be water resistant, so that under normal handling it will not absorb water and change in dielectric constant. The card is formed with a series of perforations 18 along one side that aid its insertion in the parking meter box 11, as will be described hereinafter. Printed on the top side of the card in electrically conductive ink, or sprayed metal, or a conductive semiconductor such as indium tin oxide, are successive patterns. Each pattern comprises a rectangle 19 connected at one end to a like parallel rectangle 20 by a linking strip 22 or isthmus on the side of card 16 opposite perforations 18. On the underside of the parking card is a continuous coating of electrically conductive ink or metal spray 23, shown in FIGS. 3 and 4.

The rectangular elements 19 and 20 being joined at 22 form the front face electrode of a capacitor in conjunction with the back side conducting layer 23, which forms the rear face electrode of the capacitor. If the dimensions of strip 19 are 5 cm×0.4 cm and the thickness of the card is 0.05 cm and the dielectric constant is $16 \times 10^{-14}$ farads/cm, the capacitance between 19 and 23 will be $$C = \frac{16 \times 10^{-14} \times (5 \times 0.4)}{0.05} = 6.4 \text{ pF}$$

The parallel combination of 19 and 20 through connection 22 provides twice the area and therefore has a capacitance of 12.8 pF. At a frequency of 32.8 KHz the impedance of this capacitance is $[(2 \times 32.8 \times 10^3 (12.8 \times 10^{-12})]^{-1}$ which is the equivalent of $379 \times 10^3$ ohms. At ten times this frequency a capacitance of 12.8 pF has an impedance of about $37.9 \times 10^3$ ohms. The significance of these values as explained later is that they are convenient in size for the sensing system of FIG. 5.

On a parking card that is about the dimensions of a dollar bill there is room for ten or more capacitor sensing pairs 19 and 20 instead of the six shown illustratively in FIG. 2.

Figure 4:
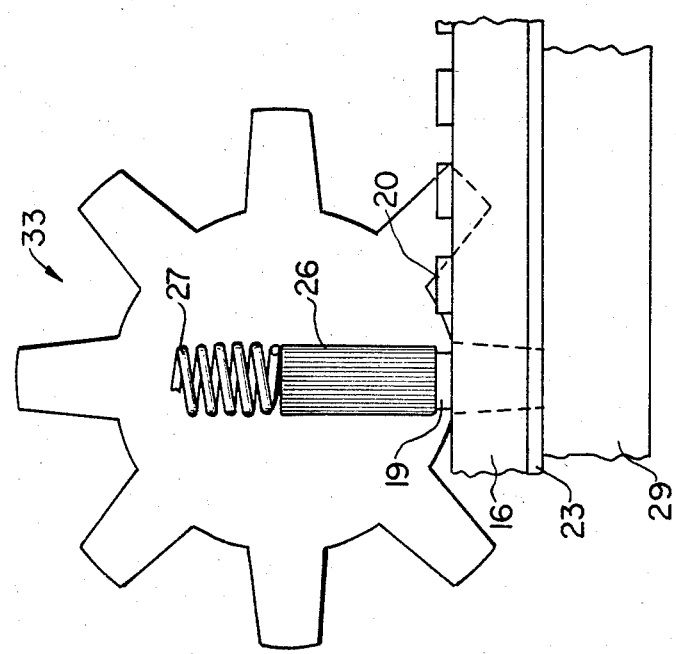
FIG. 4 is an side elevation of the apparatus of FIG. 3.
Figure 3:
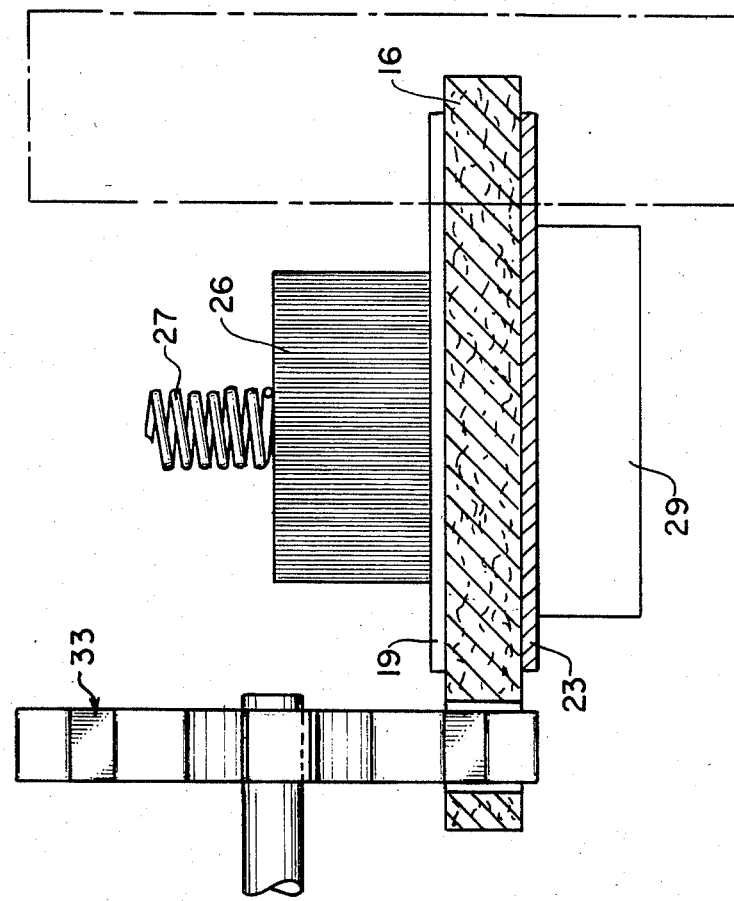
FIG. 3 is a diagrammatic end elevation of a portion of my card reading apparatus.

In FIG. 2 a cut-out rectangular notch 21 is shown in card 16 on the side opposite perforations 18. This is part of the mechanism for the alignment of the parking card for insertion in the card reader box 11. The card reader in box 11 includes a sensing contact brush 26 loaded by a compression spring 27 which brush makes contact with the capacitance electrode 19 on the upper surface of card 16, as is shown in FIGS. 3 and 4. Electrode 23 on the bottom of card 16 rests on a plate of conductive material 29. Indicator 14 as in a conventional parking meter winds back after being set as time passes so that it shows the remaining time unexpended. Further rotation of knob 13 and wind up of indicator 14 is only possible if the parking card 16 when inserted has an appropriate value of capacitance in the sensing region indicating unused prepurchased time.

For the parking card shown in FIG. 2, sensing contact brush 26 would first be on the electrode between guide notch 21 and notch 21A. In this position the contact brush would sense a capacitance of 6.4 pF since a notch 21A has been cut on the ticket during previous use separating the adjoining electrodes. In this situation no time appears on the meter 14 if lever 15 is depressed and the knob 13 is free for more rotation. This rotation advances the card so that sensing brush 26 contacts strip 19 where it detects a capacitance of 12.8 pF since a conducting strip 22 connects region 19 to 20 in parallel. In this position, depression of lever 15 cuts a notch similar to 21A at strip 22 and sets up a unit of parking time on the meter 14. If more parking time is needed further rotation of knob 13 brings the next strip 19A into the sensing position and again 12.8 pF is sensed and an interlock, to be described hereinafter, is opened so that knob 13 can be used to set up more time and allow lever 15 to cut at position 22A.

The nature of the cut may take any convenient form as illustrated by a vee notch at 24, or a circular punch hole at 25. The significant action as a result of cutting the notch, whatever its shape, is a large decrease of capacitance that can be detected by the electronic sensing system of the card reader, to be described hereinafter. The toothed wheel 33 shown in FIG. 3 is part of the card advance mechanism and is connected with card insert knob 13.

A schematic of my invention is shown in FIG. 5 where the electronics are represented by functional block diagrams.

Brush 26 and conductive card support 29 are connected to the input of a capacitance sensor 35. The capacitance sensor 35 may be any form of electronic sensor of capacitance as described in textbooks of electronic instrumentation. One form that functions well is an AC type Wheatstone-type bridge arrangement 38 with a fixed capacitance $C_s$ in one arm, the unknown capacitance $C_x$ from the parking card in another arm and two resistors $R_1$ and $R_2$ forming the other two arms of the bridge as shown in FIG. 6. An oscillator 36 powered by a battery 37 supplies alternating voltage across one diagonal of bridge 38, and an amplifier 39, also powered by battery 37, is connected across the other bridge diagonal. Convenient impedance levels are in the range 10 kilohms to 400 kilohms, to minimize power consumption and to match the impedances of the oscillator 36 and the amplifier 39.

If the variation of capacitance to be detected is from 12.8 to 6.4 pF then the oscillation that supplies the capacitance bridge should be in the frequency range 32 kHz to 1.5 MHz. This is convenient since it is typical of the range used for quartz oscillators used in electronic watches. Volume demand has driven the cost of such oscillators to a very low level.

Amplifier 39 drives logic circuit 40, which is also powered by battery 37. If the bridge 38 is unbalanced for a capacitance of 6.4 pF the output passed to amplifier 39 is high and the signal processor logic circuit 40 sends a signal to a lock mechanism 42 that operates a solenoid-driven latch 43 that allows further rotation of the wheel 33 shown in FIG. 3 and the knob 13, without setting up parking time on the meter 14.

Figure 13:
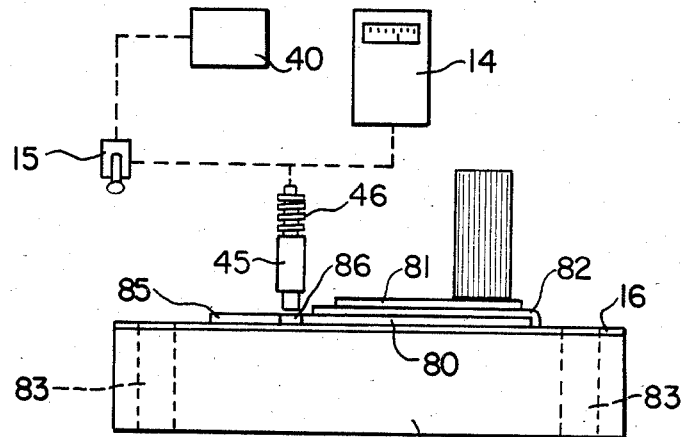
FIG. 13 is a schematic of a punch-out apparatus suitable for the card of FIG. 10.

If the further rotation of the knob 13 advances the ticket to the point where the brush 26 rests on a capacitor strip of 12.8 pF the bridge output is balanced and the signal passed to the amplifier 39 is zero or very low. The logic circuit 40 then allows depression of lever 15 that sets up a unit of parking time on meter 14. Lever 15 is connected to activate a punch 45, as is shown in FIG. 13, which may be driven by a spring 46. Punch 45 is positioned above an isthmus 22, and when operated notches the parking card 16 to deactivate one prepaid unit of capacitance.

The electrical power for the sensing and interlock system is supplied by a dry cell battery indicated by 37 in FIG. 5. Typically the battery voltage will be in the range 1.5 to 15 V and as the power demand is very low, since most of the heavy power operations are performed mechanically by the user as in a conventional coin-operated parking meter, the battery life should be in excess of one year. The battery is connected to various power consuming devices such as the oscillator 36, the amplifier 39, the logic circuits 40, the interlock box 42 and the time metering display 14. These connections however are made only in the initial stages of inserting the parking card into the meter box 11 by initial rotation of knob 13 in order to conserve power usage to a time when a ticket is under review.

It will be understood by one of ordinary skill in the art that the precise circuit arrangement of the capacitor sensor, amplifier, logic box and lock mechanism may take many forms without departure from the purpose of the invention described here. For instance, the sensor bridge may be in a balanced low-output condition for a notched capacitor (6.4 pF) and be unbalanced for an unnotched computer (12.8 pF) if the logic sequence is adjusted to correspond.

Other methods of determining a capacitance change include observing the change of oscillation frequency of an inductive-capacitive circuit, or the RC-time constant of a circuit, or a phase angle shift in an AC current.

Provision may be made in the interrogation system shown in FIG. 5 for disconnection of the power battery 37 to conserve power in the event that an attempt is made to use the system improperly such as by leaving a used or partially used card in the meter box 11, and reinstation of the system to its normal mode when the offending card is removed. The presence of small amounts of dirt on the parking card (of layer thickness some small fraction of the thickness of the card) will have relatively little effect on the capacitances sensed. Similarly, resistance in the sensing arm of sensor 38 introduced by dirt will have little effect provided its value stays well below the impedance level of the capacitors.

Figure 9:
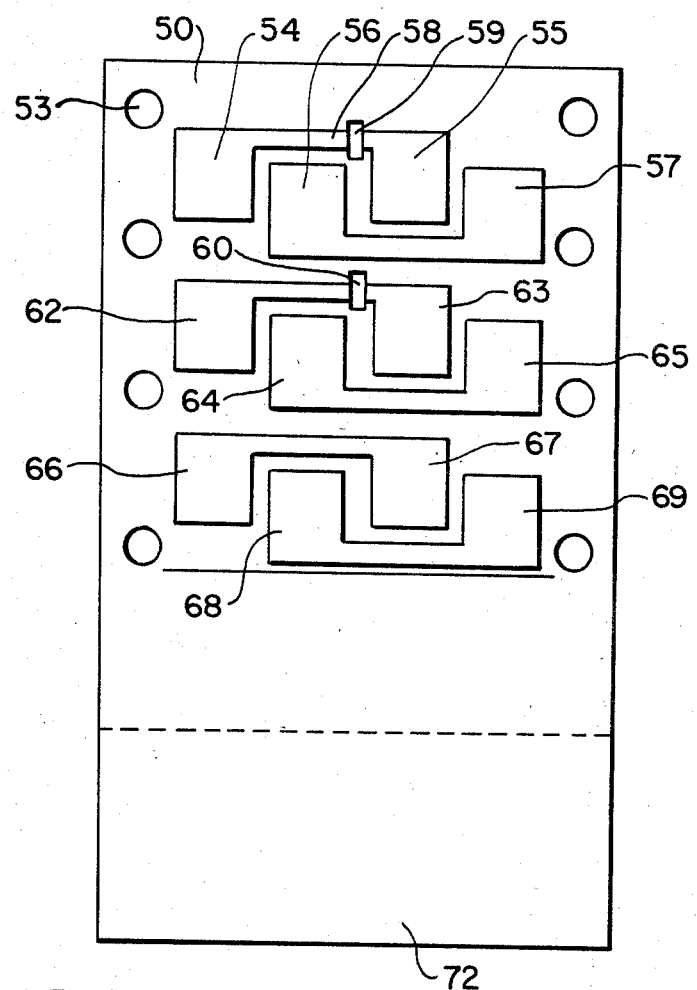
FIG. 9 is a plan of another form of card of my invention.

The geometric layout of the sensed capacitors may also take many forms: the only essential being that there should be a large change of capacitance after notching. FIG. 9 shows a card 50 with alignment holes 53 and another layout of the capacitor pairs as 54 and 55, 56 and 57 and so on, connected by an isthmus 58. The notching is then performed down the center line of the parking card as shown by the two uses indicated by notches 59 and 60. The advantage of this arrangement is that the contact brush bearing surface could be substantially square in cross-section and so more robust. It would contact 54, 62 and so on in sequence. The card could then be withdrawn and rotated so that the other end enters the machine and the brush would then bear on 69, 65 and 57 in sequence as knob 13 is rotated. On use, notches would then be cut that separate 68 from 69, and so on.

Figure 8:
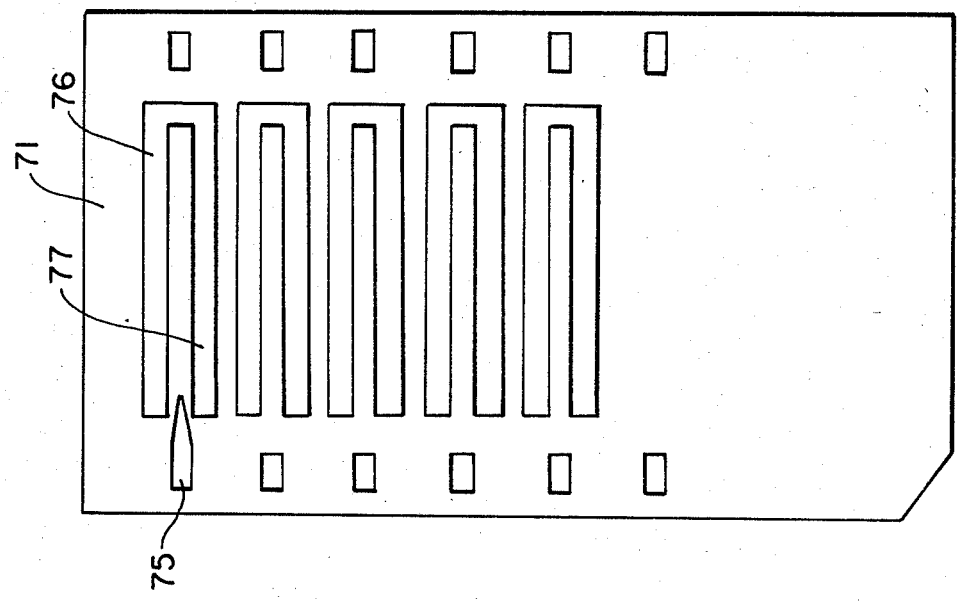
FIG. 8 is a plan of the card of FIG. 7 viewed from the bottom.
Figure 7:
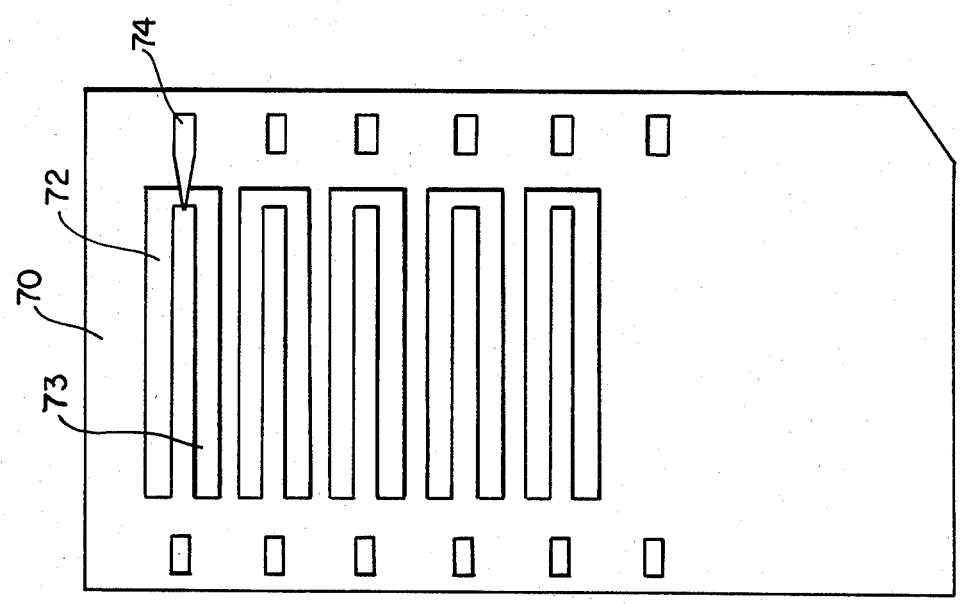
FIG. 7 is a plan of a card of my invention viewed from the top.

In FIG. 4 the metal plate 29 is a continuous plate, but there is no essential reason that the conductive layer 23 on the underside of the card should be completely continuous. Substituting instead for 23 a series of finger strips aligned with the finger strips 19, 20 and so on will have little effect on the capacitance values, beyond a slight change associated with fringing effects. Such a geometry is illustrated in FIGS. 7 and 8 where the top and bottom faces 70 and 71 of a parking card 16 are shown with similar patterns like that of FIG. 2 that are aligned so that strip 76 aligns with strip 72 and so on. The strips 72 and 73 of top face 70 are shown as electrically separated by the triangular shape cut-in notch 74. However, this notch, shown in reverse as 75 in FIG. 8, has not disconnected the strips 76 and 77 on face 71. Hence after use of all the sensing capacitors on face 70 the parking card can be turned over and face 71 used, doubling the sensing units of the card. Another method of increasing the sensing units of the card is to have the capacitor composed of three parts so that two steps of capacitance, say from 12 pF to 8 pF to 4 pF, would be achieved by the cutting sequentially of two notches. In yet another variation the bridge capacitance shown as $C_s$ in FIG. 6 may also be provided on the card and subject to change by notching.

In such ways it is practical to obtain on a parking card of approximately the size of a dollar bill, 20 to 40 parking sensitive regions representing $10 or more of prepaid parking. It is apparent that the system sensing and indicating box 11 of FIG. 1 may incorporate the coin-operated mechanism of a conventional parking meter 12 so that in new locations only a single unit is needed.

Figure 10:
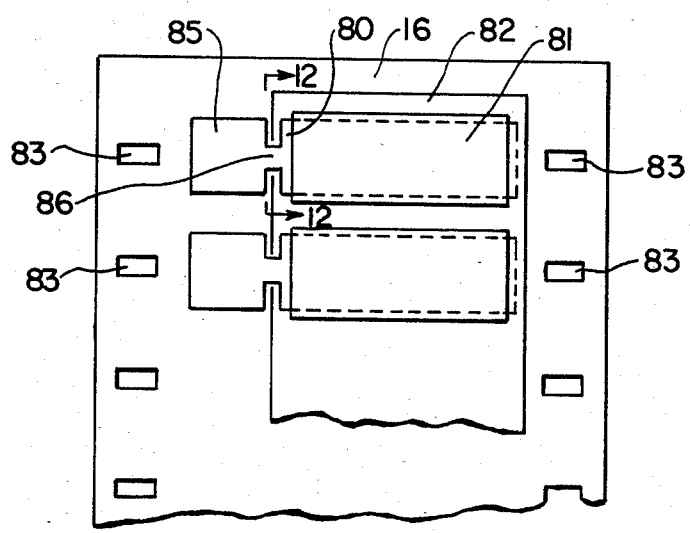
FIG. 10 is a plan of still another form of a card of my invention.
Figure 11:
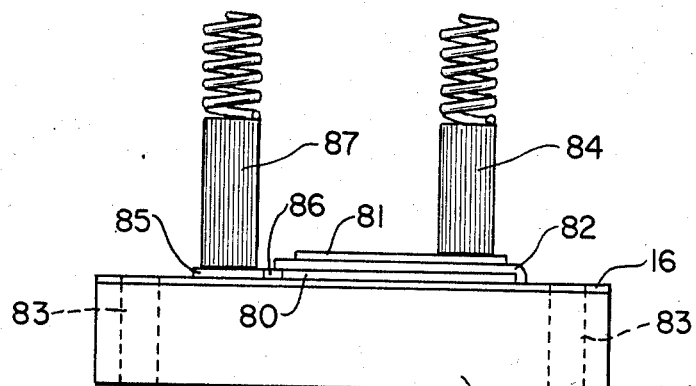
FIG. 11 is a diagrammatic end elevation of a portion of my card reading apparatus suitable for the card of FIG. 10.

Another embodiment of the invention is illustrated in FIGS. 10 and 11. In this card the capacitances representing prepayment regions are formed with both electrodes 80 and 81 on the top surface of the card and the insulator between them is a coated layer of insulation 82 formed by a thin varnish of high dielectric constant value material, such as polyurethane varnish. In FIG. 10 the notches 83 are for convenience of alignment and advance when inserting the card into the box 11. The elevation shown in FIG. 11 indicates the structure of the capacitor 80, 82, 81. An electrically conducting brush 84 bears on the top surface of electrode 81. The extension 85 is connected to the main under-electrode 80 by an isthmus 86 and located above that isthmus is a punch or cutting tool 45 as shown in FIG. 13. A second brush 87 bears on the surface 85 and completes the electrical connection of the capacitor 80, 82, 81 to the capacitor sensor circuit 35 in FIG. 5. The capacitance formed by 80, 82, 81 actuates the logic box 40 and the lock mechanism 43 and allows parking time to be entered on the meter 14 by depression of the lever 15. This actuation of the lever cuts, notches or punches the region 86 hence disconnecting region 85 from region 80. This greatly reduces the capacitance seen between brushes 84 and 87 and allows further advance of the parking card by knob 13. Thus, the next section of the card can be interrogated and more parking time set up if needed.

The advantage of the arrangement shown in FIG. 10 is that the insulating layer 82 can be thinner than the card and so provide a capacitance of adequate size while using less surface area of the card. Thus, the packing density of sensing regions can be higher than the arrangements of FIG. 2 and FIG. 9. Furthermore, the reverse side of the card may also be used for additional sensing regions.

The cutout notches indicate the sections of the card that have been used. This simple visual indication of the status of the card is an advantage to the user that would not be readily available with a magnetically coded card.

Figure 12:
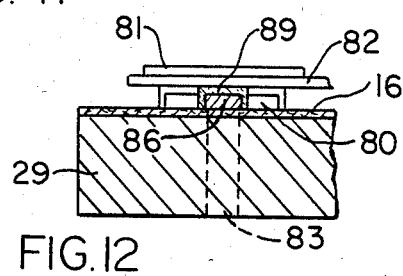
FIG. 12 is a partial cross section of the card of FIG. 10 on the plane 12—12 thereof, but also showing an insulation coating on certain areas.

However, it also opens up the possibility that an unethical user might tamper with a used card to reinstate electrical connection between paired strips such as 80 and 85 in FIG. 10 after they had been severed at isthmus 86 or strips 19 and 20 in FIG. 2 after isthmus 22 is severed. Since the process might be as simple as providing a conducting pencil mark bypassing the gap at 86 or at 22 it is desirable that glossy insulating coating be applied to the card face at the time of printing so that it is not receptive to pencil marks. This coating may be a polyurethane based varnish. It may cover the spaces between conductive areas 80 and 85 in FIG. 10 or between areas 19 and 20 in FIG. 2 or more of the card face. If the coating is thin it may be allowed to cover the whole of the card so that even a thin layer exists between area 81 and the brush 84 in FIG. 11, or area 19 and the brush 26 in FIG. 3, since the large series capacitance so formed, if the glossy layer is thin, will not greatly affect the overall capacitance swing that occurs on notching. Preferably, this glossy coating should be of high dielectric constant to increase the value of the series capacitance since the capacitance introduced is proportional to the dielectric constant of the insulator multiplied by the brush contact area and divided by the thickness of the insulating varnish. In FIG. 12 the insulating coating 89 covers isthmus 86 between conductive areas 80 and 85 as well as the portions of those areas opposite each other.

Figure 14:
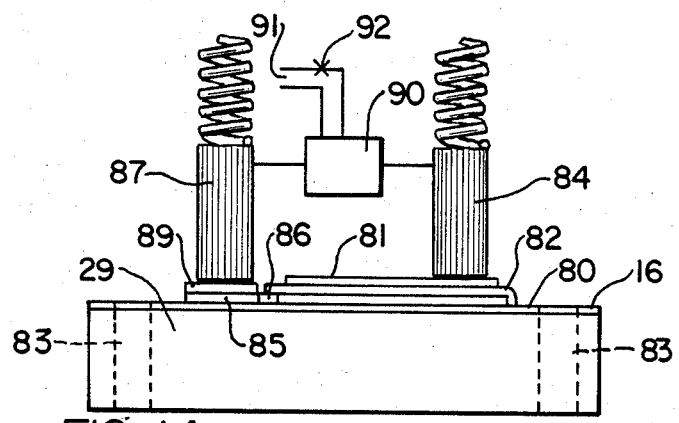
FIG. 14 is a partial schematic of electrical punchout apparatus for the card of FIG. 10.

Yet another advantage of the thin insulating region 89 illustrated in FIG. 14 is that it can be electrically punched by the application of a moderate voltage and discharge current to heat the capacitance locally and cause a conductive short circuit that alters the capacitance value and so deactivates this section of the parking card when a unit of parking time is put on the meter 14 of FIG. 5. If the insulation thickness of layer 89 is for example $5 \times 10^{-4}$ cm (5 micrometers) and if the electrical breakdown strength of the insulator is $10^6$ volts per cm, the breakdown voltage is 500 volts. Hence if the system box is supplied by a 115 V electrical supply line 91 in place of or in addition to the battery supply 37 in FIG. 5, a voltage of 500 V or greater can be readily obtained from suitable apparatus 90, for example by electrical transformer action and rectified to charge an energy storing capacitor, say 100–500 microfarads in value, and the energy can then be discharged through the sensing capacitor region on the card by closing of a contact system 92 to brushes 84 and 87 controlled by the logic circuits of the interrogation system. The energy so discharged causes local melting of the electrodes 80 and 81 and an electrically conducting short develops across the sensing capacitor. In this version of the parking card it is desirable that the conducting electrodes 80 and 81 be made of low melting point metal such as tin or indium-tin alloy. By suitable reshaping of the geometry the plates 80 and 81, the current concentration during the puncture process can be increased locally to increase the heat concentration and so aid the puncture process. Another way of assisting the process is by fabricating the conducting neck region 86 in FIG. 10 to be of very low cross-sectional area so that it acts as a fuse that is burnt out during the puncture process. Information that a particular section of sensing capacitor has been deactivated electrically is then apparent from visual inspection by the user. The advantage of electrical deactivation is that the whole parking system can be made electric including the meter-display. The disadvantage is that this is only practical in situations where a main electrical supply is available or a short battery life can be tolerated.

Figure 15:
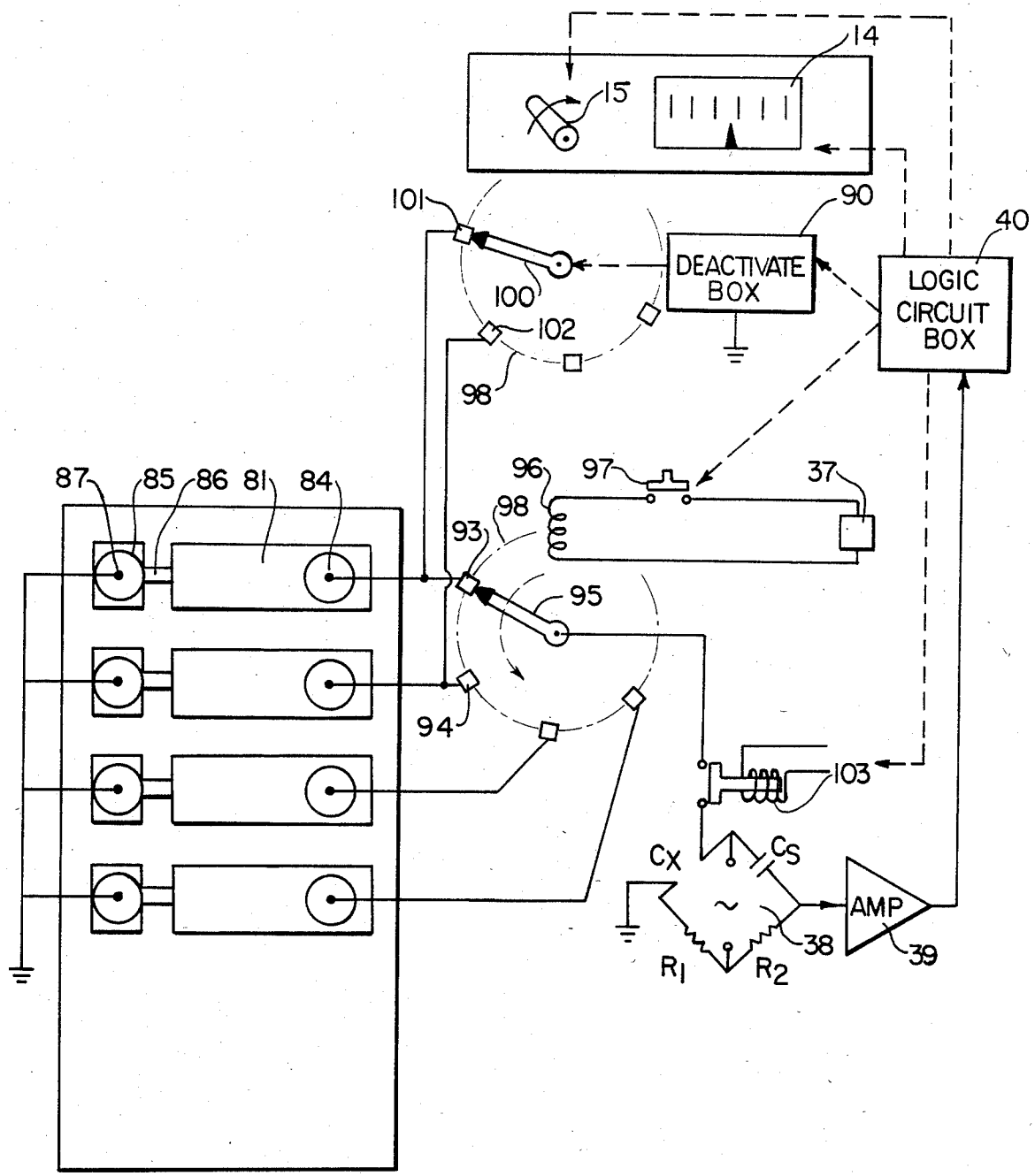
FIG. 15 is a schematic of another embodiment of my card reading apparatus.

Another embodiment of my card reading apparatus is illustrated in FIG. 15. In that embodiment the card is inserted as a whole in the reader which makes contact with all the individual capacitances carried by the card and senses them one after another until it finds one of the predetermined actuating value. The parking card is fully inserted in the system box 11 by the toothed wheel 33 rotated by the hand knob 13. The parking card in FIG. 15 is shown to be of the form in FIG. 10. Insertion of the card in the system box brings to bear the brushes 84 and 87 on the capacitor terminals 81 and 85 in FIG. 15 and similar pairs of brushes on the other capacitors on the card. These may be simple metal leaf brushes or carbon spring-loaded brushes as described earlier. Capacitor plate 84 is connected to contacts 93 and 101 of a double-deck rotary stepping switch 98, the center wiper arms 95 and 100 of which can be rotated together one step each time an electrical pulse occurs on solenoid 96. The next sensing region is connected to contacts 94 and 102 of the rotary switch 98, and so on in sequence down the parking card.

Wiper arm 95 of rotary stepping switch 98 is connected through relay 103 to one of the sensing terminals of capacitance sensor 35, for example, one of the $C_x$ terminals of Wheatstone bridge 38 shown in FIG. 6. Capacitance terminal 85 is connected through brush 87 to ground. The other $C_x$ terminal of bridge 38 is also grounded. The voltage from oscillator 36 is connected across the ungrounded diagonal of bridge 38 and the bridge output across the grounded diagonal is connected to the input of amplifier 39. The output of that amplifier is connected to logic circuit 40 which is connected to lever 15 and indicator 14 of my parking meter and to deactivating box 90 shown in FIG. 14. Logic circuit 40 is also connected with switch 97 in the circuit between power source 37 and solenoid 96 which operates stepping switch 98. Logic circuit 40 is also connected with the coil of relay 103 in circuit with wiper arm 95 and the $C_x$ input of bridge 38.

The sequence of operation is as follows. After full insertion of the card, the user operates lever 15 or an equivalent button switch. This sends an interrogate command to the logic circuit box 40. This applies power to the capacitor sensor bridge 35 and closes the relay 103 so that the bridge may sense the capacitor 81, 85. If this sensing process shows the observed value to represent an unused parking region the amplifier 39 sends a signal to the logic circuit box 40 that sets up a unit of parking time on meter 14, disconnects the sensing bridge by opening the switch 103 for protection purposes and discharges the deactivate power (box 90) through arm 100 to the contact 101 and brush 84 to contact 81 to burn out the isthmus fuse region 86 and deactivate the capacitor 85, 81. When this is done, the logic box 40 sends a pulse to relay 97 that actuates the stepping solenoid 96 from the power supply 37 and the arms 95 and 100 advance to the next contact position. The system is then in a condition to respond to further operation of lever 15 with the addition of a further unit of parking time to the meter 14.

In the event that capacitance region 85, 81 is already deactivated when the card is first inserted in the system box, the first operation of the lever 15 detects this and the logic box on sensing this instructs the stepping rotary switch to advance automatically step by step until an active capacitance region is found on the card. This is then deactivated and a unit of parking time set up.

Figure 16:
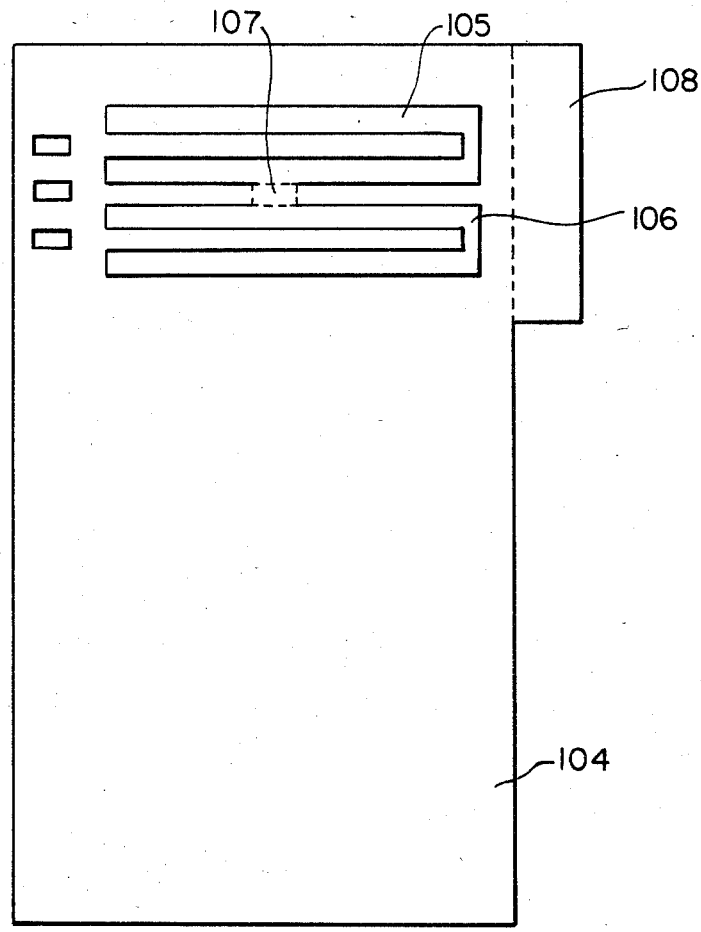
FIG. 16 is a plan of still another form of a card of my invention.

As I have mentioned it would be desirable to dispense the parking cards of my invention from retail establishments or other publicly available sources. Obviously the dispensers could be required to pay for the cards in advance. Alternatively the cards could be numbered or otherwise identified and accounted for. One way of accounting would be to furnish the cards with a tear-off tab carrying an identifying number, the tab while attached being arranged to obstruct the entry of the card into the slot of the card reader. Such a card is shown in FIG. 16. The card body 104 is similar to that of the card of FIG. 2 and carries spaced electrodes 105 and 106 and so on on one side, matched by corresponding electrodes on the other side. The entry end of card 104, however, is formed with a tab 108 projecting from one side so that the card width is greater than the corresponding dimension of the slot. Tab 108 carries an identifying number or other character. To render the card usable the vendor removes tab 108. To discourage casual shoplifting card 104 could be made of material difficult to tear and the tab removal could be effected with a papercutter or like device. The vendor would account for the cards received by the retained tabs.

Another way of accounting for cards would be to supply them to vendors electrically inactive. Such a card is also shown in FIG. 16. Adjoining areas of electrodes 105 and 106 are shown joined by an electrically conductive bridge 107. The two electrodes so paralleled would present to the card reader a capacitance twice the predetermined capacitance and so would not actuate the card reader. The vendor would be provided with a simple punching mechanism connected with a counter which would accept the card as shown and sever the bridge 107. Obviously, the card would not be provided with tab 108.

In the foregoing specification I have described a preferred embodiment of my invention; however, it will be understood that my invention can be otherwise embodied within the scope of the following claims.

I claim:

1. An automatic system for dispensing services controlled by cards carrying successively positioned individual capacitances of a predetermined value comprising a card reader including a frequency generator, capacitance sensing means driven by said frequency generator, means coupling said capacitance sensing means successively to said successively positioned individual capacitances carried by said card, means driven by said capacitance sensing means for triggering service dispensing means adapted to dispense a predetermined quantum of services in response to a capacitance of said predetermined value sensed by said capacitance sensing means, and means triggered by said capacitance sensing means for altering the magnitude of said sensed individual capacitance to a value other than said predetermined value to prevent reuse of said capacitance in said card reader.

2. The system of claim 1 including means for advancing a card into said card reader an incremental distance triggered by said capacitance sensing means.

3. The system of claim 2 in which the means coupling said capacitor sensing means to successive individual capacitances are adapted to be coupled by said advancing means with successive individual capacitances spaced from each other by said incremental distance.

4. The system of claim 1 including means for advancing a card into said card reader a distance sufficient to bring all successively positioned individual capacitances carried by said card into said card reader and said means coupling said capacitance sensing means successively to said successively positioned individual capacitances comprises scanning means which trigger said service dispensing means upon sensing a capacitance of said predetermined value.

5. The system of claim 1 adapted for a card having electrodes of each capacitance on opposite sides of the card in which the means coupling said capacitance sensing means successively to said successively positioned individual capacitances comprise a conducting surface positioned to make contact with a first electrode of said capacitance, a brush positioned to make contact with a second electrode of said capacitance, and means urging said brush against said first electrode and second electrode against said conducting surface.

6. The system of claim 1 adapted for a card having electrodes of each capacitance on the same side of the card in which the means coupling said capacitance sensing means successively to said successively positioned individual capacitances comprise a first brush positioned to make contact with a first electrode of said capacitance, means urging said first brush against said first electrode, a second brush positioned to make contact with a second electrode of said capacitance, and means urging said second brush against said second electrode.

7. The system of claim 1 in which said means for altering the magnitude of said sensed capacitance physically reduces the area of at least one capacitance electrode.

8. The system of claim 7 in which the means for altering the magnitude of a sensed capacitance comprises a punch positioned to punch a hole in an electrode of said sensed capacitance.

9. A card for the system of claim 1 comprising an insulating substrate, successive individual capacitances carried thereby, each capacitance comprising a pair of electrodes separated by a dielectric and adapted to be coupled to capacitance sensing means, at least one element of each pair of electrodes being formed as two discrete electrode areas connected by an isthmus, whereby the capacitance of each pair coupled to said sensing means is reduced below said predetermined value by severing said isthmus.

10. The card of claim 9 in which the paired electrodes are positioned one on each face of the card.

11. The card of claim 9 in which the paired electrodes are positioned on the same side of the card.

12. The card of claim 9 in which exposed electrode surface is covered at least partially with an insulating coating having a gloss not receptive to pencil marks.

13. The card of claim 9 in which the isthmus is dimensioned to be severed by mechanical punching.

14. The card of claim 9 in which said isthmus is dimensioned to be severed by application of voltage thereacross.

15. The card of claim 9 in which said isthmus is dimensioned to be severed by passage of current therethrough.

16. The card of claim 9 having adjoining electrodes of the two entry end successive individual capacitances electrically connected so that their total capacitance exceeds the predetermined value to which the capacitance sensing means respond, said electrical connection being disposed to permit mechanical severing thereof.

17. The card of claim 9 adapted for insertion in a slot having at its entry end a tab projecting therefrom so as to prevent entry of said card into said slot until said tab is removed.

* * * * *

UNITED STATES PATENT AND TRADEMARK OFFICE
CERTIFICATE OF CORRECTION

PATENT NO. : 4,587,410
DATED : May 6, 1986
INVENTOR(S) : ARTHUR G. MILNES

It is certified that error appears in the above-identified patent and that said Letters Patent is hereby corrected as shown below:

Column 1, line 53, after "complicated" insert --mechanical--.

Column 2, line 10, "capacitivelyen-" should read --capacitively en- --.

Column 3, line 36, insert a period (.) after capacitance.

Column 10, line 38, after "a" insert --presently--.

Signed and Sealed this

Thirtieth Day of September 1986

[SEAL]

Attest:

DONALD J. QUIGG

Attesting Officer

Commissioner of Patents and Trademarks